(12) United States Patent
Ge et al.

(10) Patent No.: US 9,288,365 B2
(45) Date of Patent: Mar. 15, 2016

(54) SYSTEM AND METHOD FOR CONTROLLING ACCESS TO A SERVER ON AN IMAGE PROCESSING DEVICE

(71) Applicants: CANON INFORMATION AND IMAGING SOLUTIONS, INC., Melville, NY (US); CANON U.S.A., INC., Melville, NY (US)

(72) Inventors: Jiuyuan Ge, Centereach, NY (US); Nigel Patrick Brady, New York, NY (US); Song Sheng Cang, Jericho, NY (US); Lance Yiuchong Leung, New York, NY (US); Kosuke Nakashima, Great Neck, NY (US); Konstantin Uroskin, New York, NY (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 0 days.

(21) Appl. No.: 14/562,712

(22) Filed: Dec. 7, 2014

(65) Prior Publication Data
US 2015/0163377 A1 Jun. 11, 2015

Related U.S. Application Data

(60) Provisional application No. 61/913,200, filed on Dec. 6, 2013, provisional application No. 61/913,161, filed on Dec. 6, 2013.

(51) Int. Cl.
*H04N 1/44* (2006.01)
*H04N 1/00* (2006.01)

(52) U.S. Cl.
CPC ......... *H04N 1/4413* (2013.01); *H04N 1/00312* (2013.01); *H04N 1/4426* (2013.01)

(58) Field of Classification Search
None
See application file for complete search history.

(56) References Cited

U.S. PATENT DOCUMENTS

| 7,818,582 | B2 | 10/2010 | Marion et al. |
| 8,054,488 | B2 | 11/2011 | Lee |
| 8,060,921 | B2 | 11/2011 | Lovat et al. |
| 8,402,271 | B2 | 3/2013 | Ueno |
| 8,493,604 | B2 | 7/2013 | Hayami |
| 8,572,703 | B2 | 10/2013 | Kitada et al. |
| 2012/0092708 | A1* | 4/2012 | Hayami ...................... 358/1.15 |
| 2013/0318585 | A1 | 11/2013 | Hosoda |

* cited by examiner

*Primary Examiner* — Thomas D Lee
(74) *Attorney, Agent, or Firm* — Canon U.S.A., Inc. IP Division

(57) ABSTRACT

Methods, systems, and computer-readable media are provided. Some embodiments include generating credentials for accessing a transmission service; sending, from a first application to a second application, the credentials and a request to perform operations related to a scan job; receiving, at the first application from the second application, credentials from the second application, and a request to access the transmission service; determining whether the credentials from the second application are valid; and in response to determining that the credentials from the second application are valid, getting a file from the second application using the transmission service; and sending the file to a destination.

19 Claims, 10 Drawing Sheets

SYSTEM AND METHOD FOR CONTROLLING ACCESS TO A SERVER ON AN IMAGE PROCESSING DEVICE

CROSS-REFERENCE TO RELATED APPLICATIONS

This application claims the benefit of U.S. Provisional Application No. 61/913,200, filed Dec. 6, 2013, and this application claims the benefit of U.S. Provisional Application No. 61/913,161, filed Dec. 6, 2013, both of which are hereby incorporated by reference herein in their entirety.

BACKGROUND OF THE INVENTION

1. Field of the Invention

The present invention relates generally to controlling access to a server on an image processing device.

2. Description of the Related Art

A typical MFP usually comes with a native Scan and Send application. The native application can scan a document and send to a remote server through some common protocols such as FTP (File Transfer Protocol), WebDAV (Web Distributed Authoring and Versioning) and SMB (Server Message Block). But sometimes the customer wants to send the scanned document to somewhere else such as a third party's content management system or a cloud that is not covered by the native application. In this case a customized scan and send solution is needed to fulfill the business need. Comparing to the native application, the only difference for the customized solution is the sending portion and the scanning portion should be similar. To save the cost as well as to boost the operation consistency across the different applications (to decrease the learning curve of the end user), it is desirable for the customized solution to reuse the scanning portion of the native application and only handle the sending portion. One way to do it is: the customized solution implements a common protocol (e.g. FTP, WebDAV or SMB) as a server in a minimal way just to be able to get the file data transferred from a client. When a scan and send is needed, the customized solution will pass its own information as a server (such as the network address of the MFP, user name and password of the implemented server) to the native application and let the native application to do the scanning and sending. After the native application finishes sending, the customized solution will get the scanned document by its implemented server and then it can go on to send it to somewhere else and accomplish its own business. For the customized solution, as a simple server, one challenge is how to secure the server to prevent unauthorized access. Since the customized solution knows both the server and client sides, it is convenient for the application to hard code a user name and password instead of utilizing a sophisticated user management system for authentication and authorization. This simplifies the server implementation and saves cost.

But hard coded user name and password are not safe enough no matter how complicated they are. Since more than one person can know the information, the leaking can happen accidently or on purpose, especially when the person who knows it leaves the company. On the other hand, a hacker can always attack such a FTP site by brute-force search for the hard coded user name and password.

In addition, it is known that modern computing systems often employ security measures to prevent breaches of the computing system. For example, computing systems may require users to be authenticated before granting them access to one or more resources of the computing system. Authentication may include the computing system prompting the user to provide a credential in order to log in to the computing system. The authentication may be based on a username and password, a smart card and personal identification number (PIN), or other information associated with the user. Once logged in to the computing system, the user has access to one or more resources of the computing system.

However, while secure authentication mechanisms can reduce the risk of unauthorized access to protected resources, those authentication mechanisms may become barriers hindering authorized users from accessing protected resources. Users may desire the ability to change from interacting with one application to another application without regard to authentication barriers that protect each particular system supporting those applications. In order to reduce such burdens on authorized users while maintaining system security, some computing systems have implemented single sign-on mechanisms.

In systems with single sign-on capability, a user provides a credential once and gains access to multiple computing systems without providing their credential again, even though each computing system requires the user to be authenticated. For example, a user may provide a credential only once and gain access both to resources of a computing device and to resources of an application associated with the computing device even though both the computing device and the application independently require the user to be authenticated before granting the user access to resources of the respective systems.

BRIEF SUMMARY OF THE INVENTION

Methods, systems, and computer-readable media for controlling access to a server are disclosed.

Some embodiments of the invention include generating credentials for accessing a transmission service; sending, from a first application to a second application, the credentials and a request to perform operations related to a scan job; receiving, at the first application from the second application, credentials from the second application, and a request to access the transmission service; determining whether the credentials from the second application are valid; and in response to determining that the credentials from the second application are valid, getting a file from the second application using the transmission service; and sending the file to a destination.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

In some embodiments, this invention provides a method to solve the above problems: instead of hard coding the user name and password, a random user name and password will be generated when the application is started. Since the user name and password are randomly generated, nobody can know them beforehand so the leaking by humans can be eliminated. As to the brute-force attack, since the user name and password are randomly generated, it is hard to guess and they can be changed easily by application restarting or device rebooting, which makes brute force attacking much harder if it is not impossible. The application can go even further to generate the random user name and password right before each data transmission and clear the username and password right after the data transmission so that all the connection request between the data transmissions will be denied by the server. By doing this, it is practically impossible for the user name and password to be guessed by a brute-force attack given the short period of data transmission time.

This invention describes a simple yet a secure way to safeguard the server access. The random user name and password generation is easy to implement. Comparing to a sophisticated user management system such as one that has a complicated password policy, the invention can do better than it since both the user name and password will be the secrets and they are not persisted on the disk. In addition, the user name and password can be changed much easier and more frequent since the change can happen as part of device rebooting or even for every data transmission without any manual intervention. By introducing this method, the security concern is eliminated when a native Scan and Send application is included into a customized solution.

Figure 1:
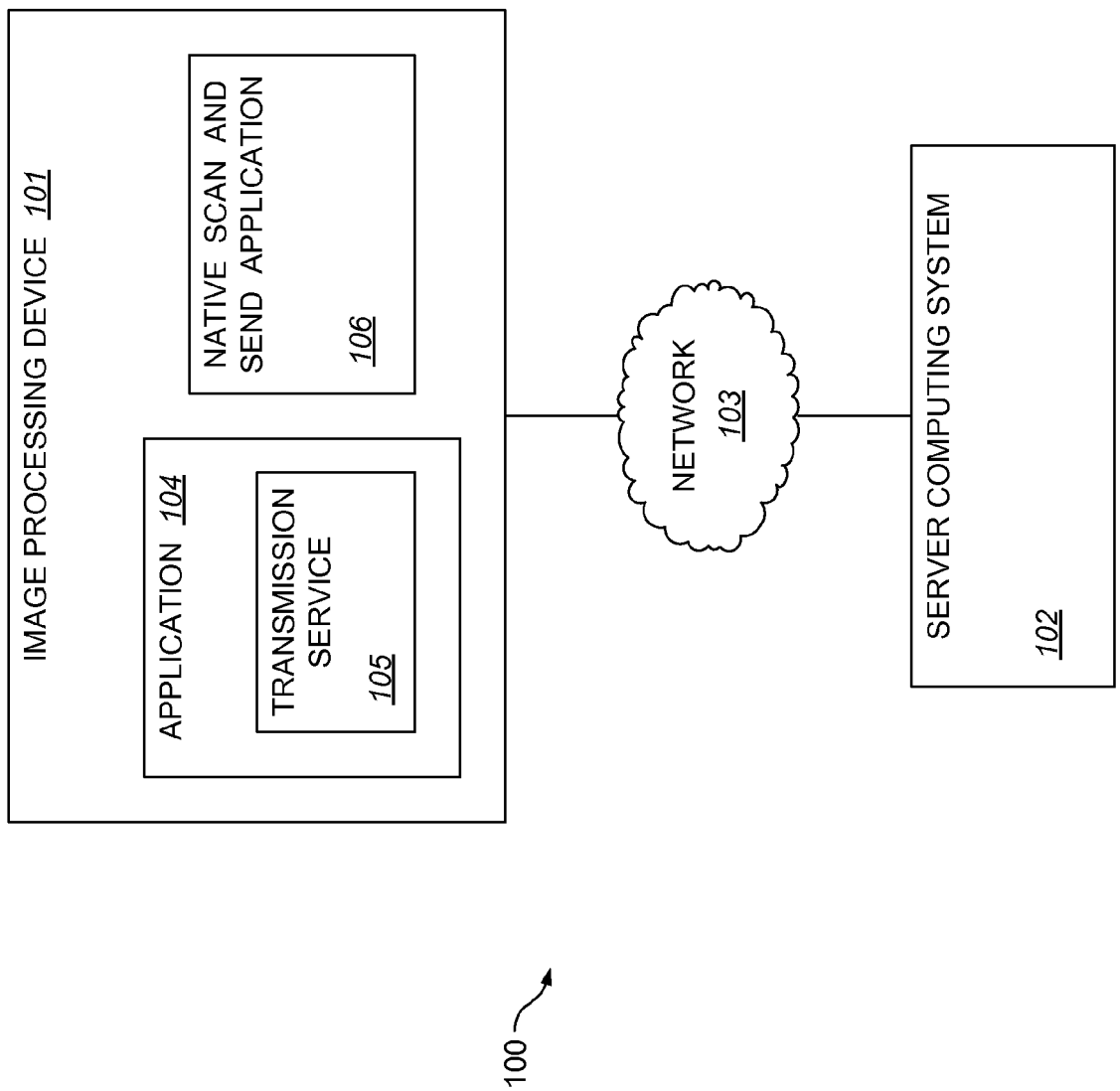
FIG. 1 illustrates an example network environment.

Embodiments of the present invention are described with reference to the drawings. FIG. 1 illustrates an example network environment 100. An image processing device 101 and a server computing system 102 are connected to a network 103. The image processing device 101 has an application 104 with a transmission service 105, and a native scan and send application 106. The transmission service 105 may be an FTP server for the application 104.

The network 103 couples one or more servers and one or more clients to each other. The network 103 may be any suitable network. For example, one or more portions of the network 103 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 103 may include one or more networks.

Figure 2:
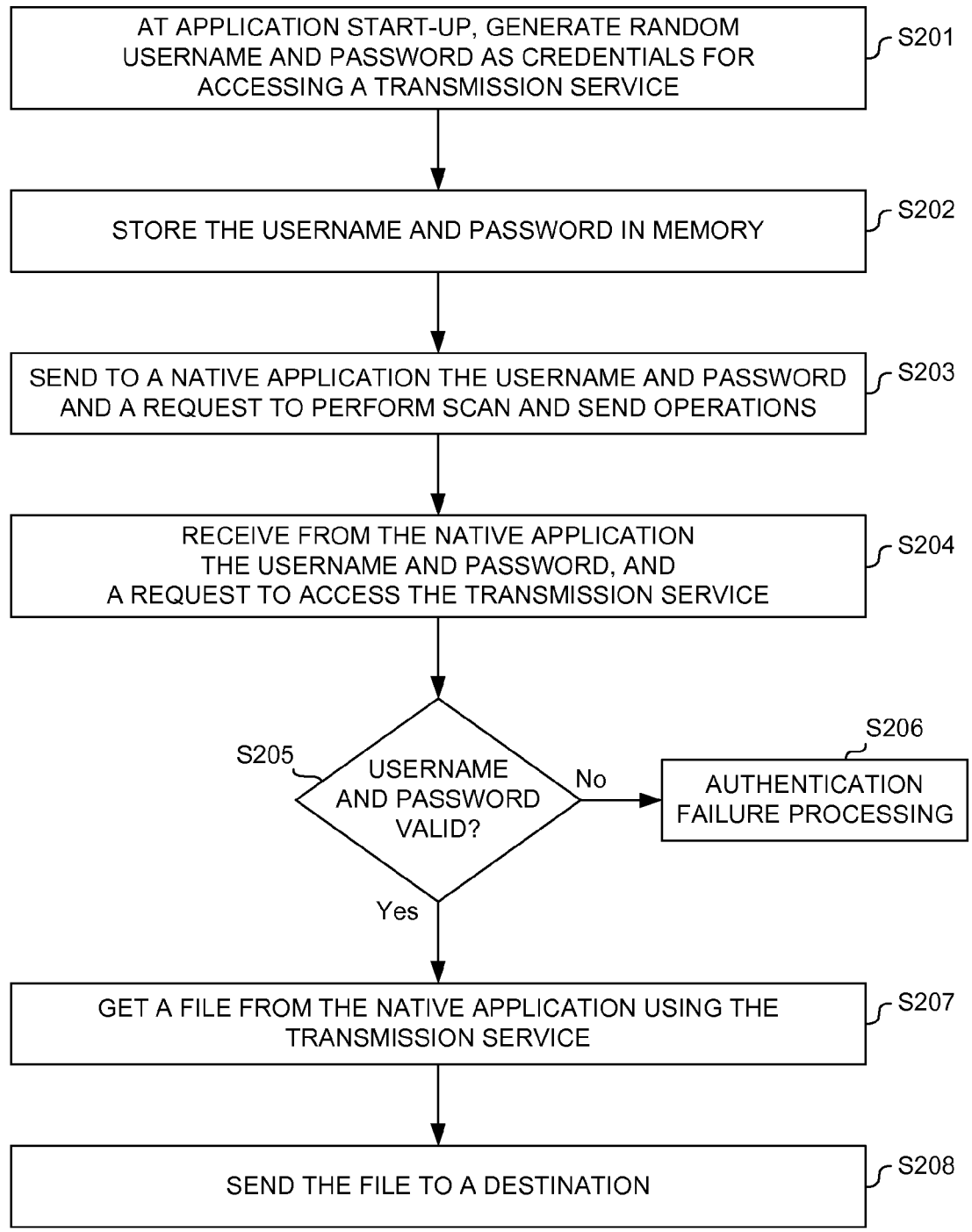
FIG. 2 illustrates an example flow of operations at an image processing device.
Figure 3:
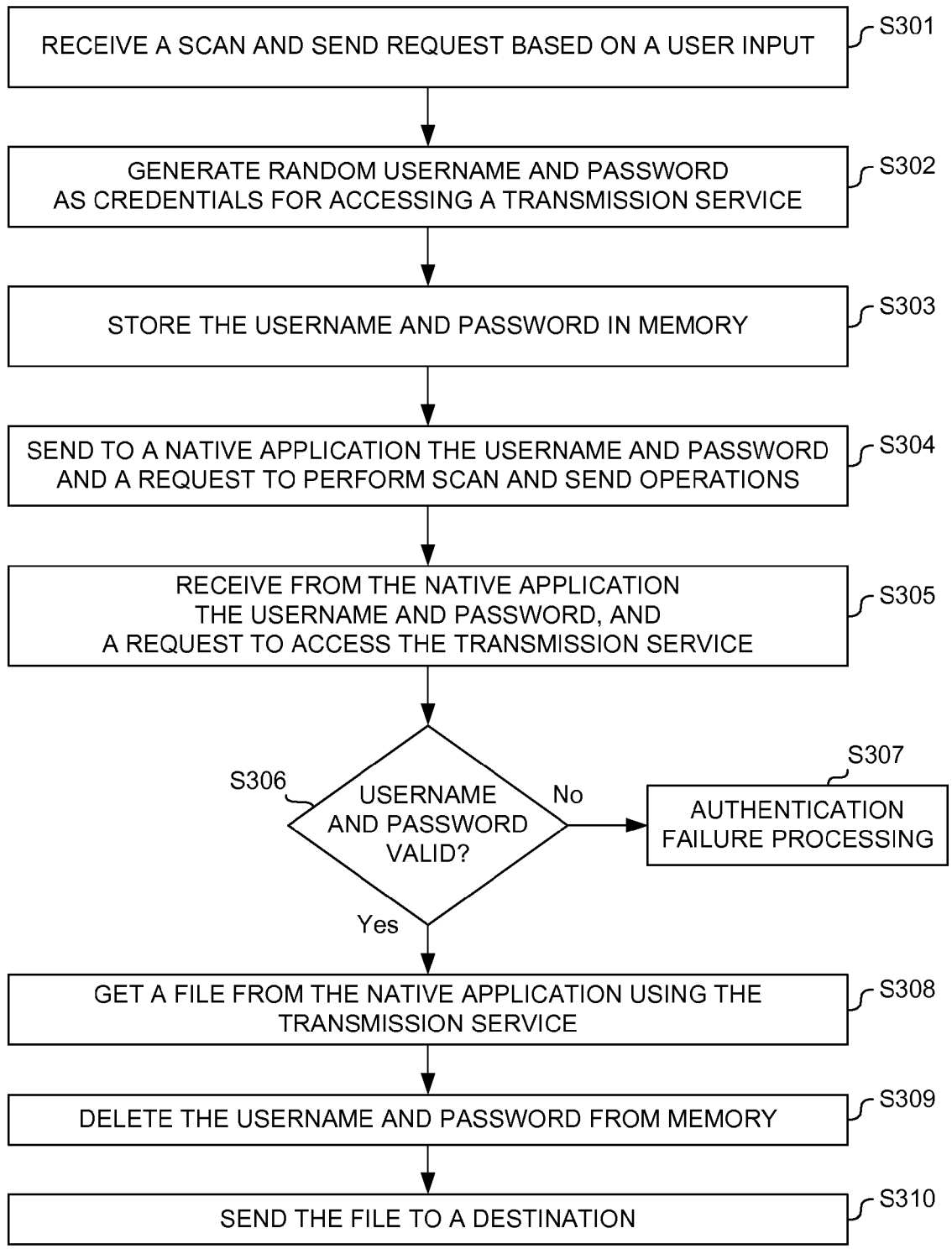
FIG. 3 illustrates an example flow of operations at an image processing device.

FIGS. 2 and 3 are described with reference to the example network environment 100 of FIG. 1. FIGS. 2 and 3 illustrate different example flows of operations at the image processing device 101. The operations are performed by the application 104.

In step S201, at start-up of the application 104, the application 104 generates a random username and password as credentials for accessing the transmission service 105. For example, the application 104 may generate the random username and password when the application 104 is first accessed by a user or when the image processing device 101 has been rebooted.

In step S202, the application 104 stores the random username and password in a memory such that the random username and password are associated with the transmission service 105 in order to log in to the transmission service 105. The random username and password may be stored in volatile memory. The random username and password may be stored in a cache.

In step S203, the application 104 sends to the native scan and send application 106 the username and password and a request to perform scan and send operations for a scan and send job. In addition to the username and password and the request, the application 104 also provides scan settings and other information related to the job to the native scan and send application 106. Moreover, in some embodiments, the application 104 also sends its own IP address or other identifier associated with the application 104 to the native scan and send application 106. The native scan and send application 106 may then later use the identifier to send a scanned document to the application 104 by transferring file data.

In step S204, the application 104 receives from the native scan and send application 106 the username and password for accessing the transmission service 105, and a request to access the transmission service 105. For example, the native scan and send application 106 may send a connection request prior to file data being transferred from the native scan and send application 106. In some embodiments, the application 104 also receives the identifier sent in step S203.

In step S205, the application 104 determines whether the username and password are valid. In some embodiments, the application 104 first verifies that the IP address or other identifier that was received in step S204 is an identifier associated with the application 104. Then the application 104 determines whether the username and password are valid by comparing the username and password received in step S204 with the username and password stored in step S202. If the username and password received in step S204 do not match the username and password in the memory, the application 104 determines that the username and password are not valid (No in step S205), and the process advances to step S206. In step S206, authentication failure processing is executed. For example, the application 104 may determine not to execute the requested operations and then clear data associated with the request.

On the other hand, if the username and password received in step S204 do match the username and password in the memory, the application 104 determines that the username and password are valid (Yes in step S205), and the process advances to step S207.

In step S207, the application 104 gets a file from the native scan and send application 106 using the transmission service 105. The file may be an electronic document generated based on the scan and send job sent to the native scan and send application 106. The application 104 uses the transmission service 105 to get the file data transferred from the native scan and send application 106. The transmission service 105 may be a server, implemented by the application 104, that receives file data using a protocol (e.g., FTP, WebDAV, SMB). For example, the transmission service 105 may be an FTP server for the application 104.

In step S208, the application 104 sends the file to a destination. For example, in step S207, the application 104 may use the transmission service 105 to get a scanned document and then, in step S208, the application 104 may send the scanned document to a destination. The destination may be the server computing system 102 of FIG. 1.

Turning now to FIG. 3, in step S301, the application 104 receives a scan and send request based on a user input to the image processing device 101.

In step S302, the application 104 generates a random username and password as credentials for accessing the transmission service 105.

In step S303, the application 104 stores the random username and password in a memory such that the random username and password are associated with the transmission service 105 in order to log in to the transmission service 105. The random username and password may be stored in volatile memory. The random username and password may be stored in a cache.

In step S304, the application 104 sends to the native scan and send application 106 the username and password and a request to perform scan and send operations for a scan and send job. In addition to the username and password and the request, the application 104 also provides scan settings and other information related to the job to the native scan and send application 106. Moreover, in some embodiments, the application 104 also sends its own IP address or other identifier associated with the application 104 to the native scan and send application 106. The native scan and send application 106 may then later use the identifier to send a scanned document to the application 104 by transferring file data.

In step S305, the application 104 receives from the native scan and send application 106 the username and password for accessing the transmission service 105, and a request to access the transmission service 105. For example, the native scan and send application 106 may send a connection request prior to file data being transferred from the native scan and send application 106. In some embodiments, the application 104 also receives the identifier sent in step S304.

In step S306, the application 104 determines whether the username and password are valid. In some embodiments, the application 104 first verifies that the IP address or other identifier that was received in step S305 is an identifier associated with the application 104. Then the application 104 determines whether the username and password are valid by comparing the username and password received in step S305 with the username and password stored in step S303. If the username and password received in step S305 do not match the username and password in the memory, the application 104 determines that the username and password are not valid (No in step S306), and the process advances to step S307. In step S307, authentication failure processing is executed. For example, the application 104 may determine not to execute the requested operations and then clear data associated with the request.

On the other hand, if the username and password received in step S305 do match the username and password in the memory, the application 104 determines that the username and password are valid (Yes in step S306), and the process advances to step S308.

In step S308, the application 104 gets a file from the native scan and send application 106 using the transmission service 105. The file may be an electronic document generated based on the scan and send job sent to the native scan and send application 106. The application 104 uses the transmission service 105 to get the file data transferred from the native scan and send application 106. The transmission service 105 may be a server, implemented by the application 104, that receives file data using a protocol (e.g., FTP, WebDAV, SMB). For example, the transmission service 105 may be an FTP server for the application 104.

In step S309, the application 104 deletes the username and password from memory. Thus, according to FIG. 3, the random user name and password are generated right before each data transmission and then the username and password are cleared right after the data transmission. Accordingly, any connection requests between the data transmissions would be denied by the server.

In step S310, the application 104 sends the file to a destination. For example, in step S308, the application 104 may use the transmission service 105 to get a scanned document and then, in step S310, the application 104 may send the scanned document to a destination. The destination may be the server computing system 102 of FIG. 1.

Turning to the example network environment 400 of FIG. 4, various features and functionality are described below with reference to FIG. 4.

In some embodiments, an application on a computing system employs an authentication mechanism to prevent unauthorized use of the application. The computing system may be an image processing device, such as a multifunction peripheral. For example, an application on a multifunction peripheral may have some authentication mechanism to prevent unauthorized use of the application. A user may be required to input a username and password or something similar to get authenticated before using the functionality of the application. Moreover, in some embodiments, the multifunction peripheral itself may employ a device-wide login application to protect the entire device, meaning the user has to get authenticated before any functionality, including the functionality of the application on the multifunction peripheral, can be used. If such a login application is employed and enabled on the multifunction peripheral, a single sign-on mechanism may be utilized to alleviate the efforts of the end user to use the application. For example, the login application and the application on the multifunction peripheral may cooperate to share information so that the user can sign on to the application automatically after logging in to the login application.

In conventional systems, the login application and the application on the computing system may not be aware of each other, which may hinder the sharing of credentials, for example. In some conventional systems, a common credential sharing service or mechanism can be introduced to help sharing the credentials, which makes the cooperation of the login application and the application on the computing system possible in terms of credential sharing, as long as both applications want to achieve single sign-on. But even so, in some cases, the login application and the application on the computing system may use different user management systems to authenticate the user, which may hinder single sign-on from being achieved by use of shared credentials.

Embodiments of the present invention include features which address one or more of the problems of conventional systems described above. In some embodiments, when a user logs in to the device by a login application, usually a login context (which contains the login user's username and domain information) will be created by the login application and passed to all the applications that are interested in it. For the first time use, the user still needs to input the credentials to login to an application on the device, but upon the first successful login, the credentials for the application will be stored in association with a key fabricated using the username and domain from the login application, the username and domain retrieved from the login context passed down from the login application. As an example, the fabricated key could be something like domain/username (e.g., testDomain/user1). So, if the user logs in to the device again through the login application and if the application on the device is accessed, the credentials for the application for that user will be retrieved from the application by the key (fabricated using the username and domain information retrieved from the login context). The retrieved credentials can be used to populate the text fields of the login screen of the application on the device (e.g., username and password fields). The user can just press the login button to log in to the application without the need to type in any credentials. Or the retrieved credentials can be used by the application to perform the authentication to its own user management system and once authentication is successful, the user will be automatically signed in to the application. Thus, single sign-on can be achieved easily for all the login applications without any additional efforts from them. The saved credentials can be encrypted before saving and decrypted before using to enhance the security. Also a configuration entry can be exposed to the Administrator of the application on the device to turn on/off this single sign-on feature based on the need.

Embodiments of this invention provide a convenient method for an application to achieve single sign-on to any login application without the need for the login application to do anything. Thus, in some embodiments, no login application modification is needed, which makes the single sign-on support much broader than the existing approaches. For example, the login application might use a smart card login method to log in a user to a company's own WINDOWS domain system, but the application on the device may need to log in to a third party's document management system which not only needs the username and user password information, but also the server name and server password information of the third party server. By virtue of embodiments of this invention, the user just needs to input the server name, server password, username and user password information once for the first login and can enjoy single sign-on thereafter.

Figure 4:
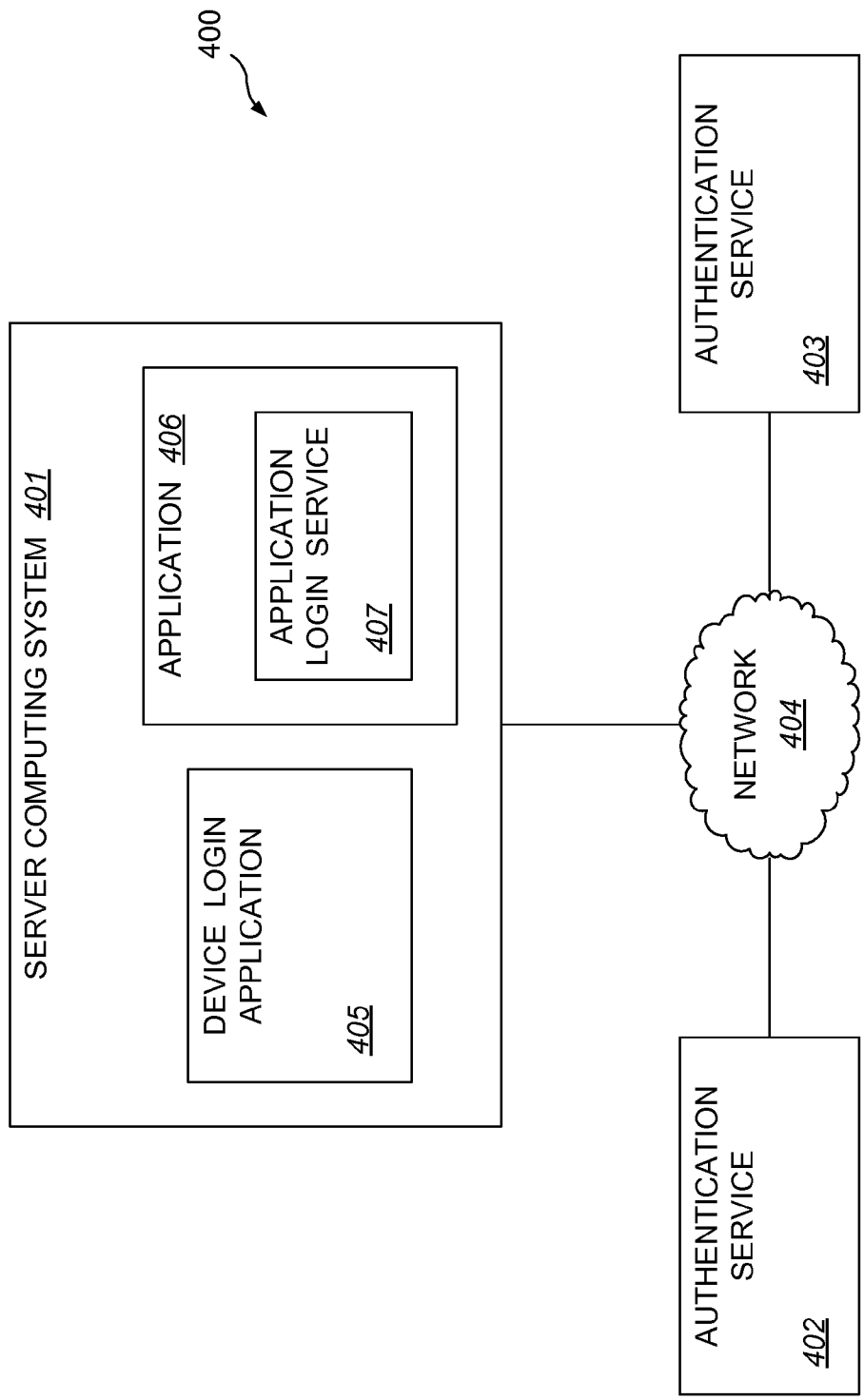
FIG. 4 illustrates an example network environment.

FIG. 4 illustrates an example network environment 400. A server computing system 401 having a device login application 405 and an application 406, an authentication service 402, and an authentication service 403 are connected to a network 404.

The server computing system 401 includes hardware, software, or both for providing the functionality of the server computing system 401. The server computing system 401 may include one or more servers. For example, the server computing system 401 may include one or more application (s) servers, file servers, database servers, name servers, mail servers, fax servers, or print servers. In some embodiments, the server computing system 401 is unitary. In some embodiments, the server computing system 401 is distributed. The server computing system 401 may span multiple locations. The server computing system 401 may span multiple machines.

In some embodiments, the server computing system 401 performs one or more steps of one or more methods described or illustrated herein. In some embodiments, the server computing system 401 provides functionality described or illustrated herein. In some embodiments, software running on the server computing system 401 performs one or more steps of one or more methods described or illustrated herein or provides functionality described or illustrated herein. Particular embodiments include one or more portions of the server computing system 401.

The server computing system 401 includes the device login application 405 and the application 406. The device login application 405 includes programs and data for controlling access to resources of the server computing system 401. According to various embodiments, the device login application 405 is configured to authenticate users, control access to resources based on authorization, and/or track users' usage of the server computing system 401.

In some embodiments, the device login application 405 uses outside computing systems to perform tasks. For example, the server computing system 401 may be in a network domain that utilizes the authentication service 402 to authenticate users trying to access resources in the network domain. In such a case, the device login application 405 may send an authentication request to the authentication service 402 for authenticating the user. The server computing system 401 may be configured for multiple network domains. Accordingly, the device login application 405 may utilize multiple authentication services to authenticate users in the respective network domains.

When a user logs in to the server computing system 401, upon being authenticated, the device login application 405 sends notification of the log-in event to all applications and/or systems configured to receive the notifications. A listing of applications and/or systems configured to receive the log-in event notifications may be stored at the device login application 405 and/or the authentication service 402. In some embodiments, applications and/or systems who receive the log-in event notifications initiate operations to log in the user to their respective applications and/or systems. Accordingly, single sign-on may be effectuated since the user is logged in both to the server computing system 401 and the respective applications who received the log-in event notifications, even though the user only provided the credential once in order to log in to the server computing system 401.

While the device login application 405 generally protects usage of the entire server computing system 401 by controlling access to its resources, some applications on the server computing system 401 may be independently protected by authentication mechanisms. The application 406 is one such application.

The application 406 includes the application login service 407 to control access to resources of the application 406. The application 406 may also include programs and data configured to execute task-specific functionality. Before granting a user access to resources of the application 406, the application login service 407 authenticates the user regardless of whether other applications also authenticate the user. According to some embodiments, the user is logged in to the application 406 by a single sign-on process such as described herein.

In some embodiments, the application login service 407 uses outside computing systems to perform tasks. For example, the application 406 may be in a network domain that utilizes the authentication service 403 to authenticate users trying to access resources in the network domain. In such a case, the application login service 407 may send an authentication request to the authentication service 403 for authenticating the user. Accordingly, the server computing system 401 may be configured to authenticate to the authentication service 402, while the application 406 on the server computing system 401 is configured to authenticate to a different authentication service, namely the authentication service 403.

Once logged in to the application 406, the user gains access to one or more resources of the application 406, including the task-specific functionality of the application 406. The task-specific functionality of the application 406 enables the user to perform one or more tasks using the application 406. For example, the application 406 may provide various functions, features and user interfaces for processing image data, transmitting data over a network, managing one or more databases, or other tasks. In some embodiments, the application 406 is configured to use one or more resources of the server computing system 401 to perform an operation in response to an instruction from the user. For example, the application 406 may use functionality of and/or information on the server computing system 401 to carry out an operation.

The authentication service 402 and the authentication service 403 may each be one or more computing systems configured to authenticate the user of the server computing system 401 and the application 406, respectively. For example, before a user of a computing system or application is granted access to a protected resource of the computing system or application, the user may be required to provide a credential, such as a username and password. The server computing system 401 or application 406 and the authentication service 402 or the authentication service 403, respectively, then communicate and execute various processes according to an authentication protocol such as Kerberos, Windows NT LAN Manager (NTLM), Lightweight Directory Access Protocol (LDAP) or other authentication protocol, in order to determine whether the credential is valid. Once the credential is validated, the user is granted access to the resource. In some embodiments, in addition to verifying the user's identity, the authentication service 402 and the authentication service 403 further determine whether the user has permission or authorization to access one or more of the resources sought.

The authentication service 402 and the authentication service 403 may each provide authentication services for multiple computing systems and/or applications. Also, the authentication service 402 and the authentication service 403 may each be associated with a particular network domain, performing authentication services for computing systems and/or applications within that network domain.

The network 404 couples one or more servers and one or more clients to each other. The network 404 may be any suitable network. For example, one or more portions of the network 404 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 404 may include one or more networks.

Figure 5:
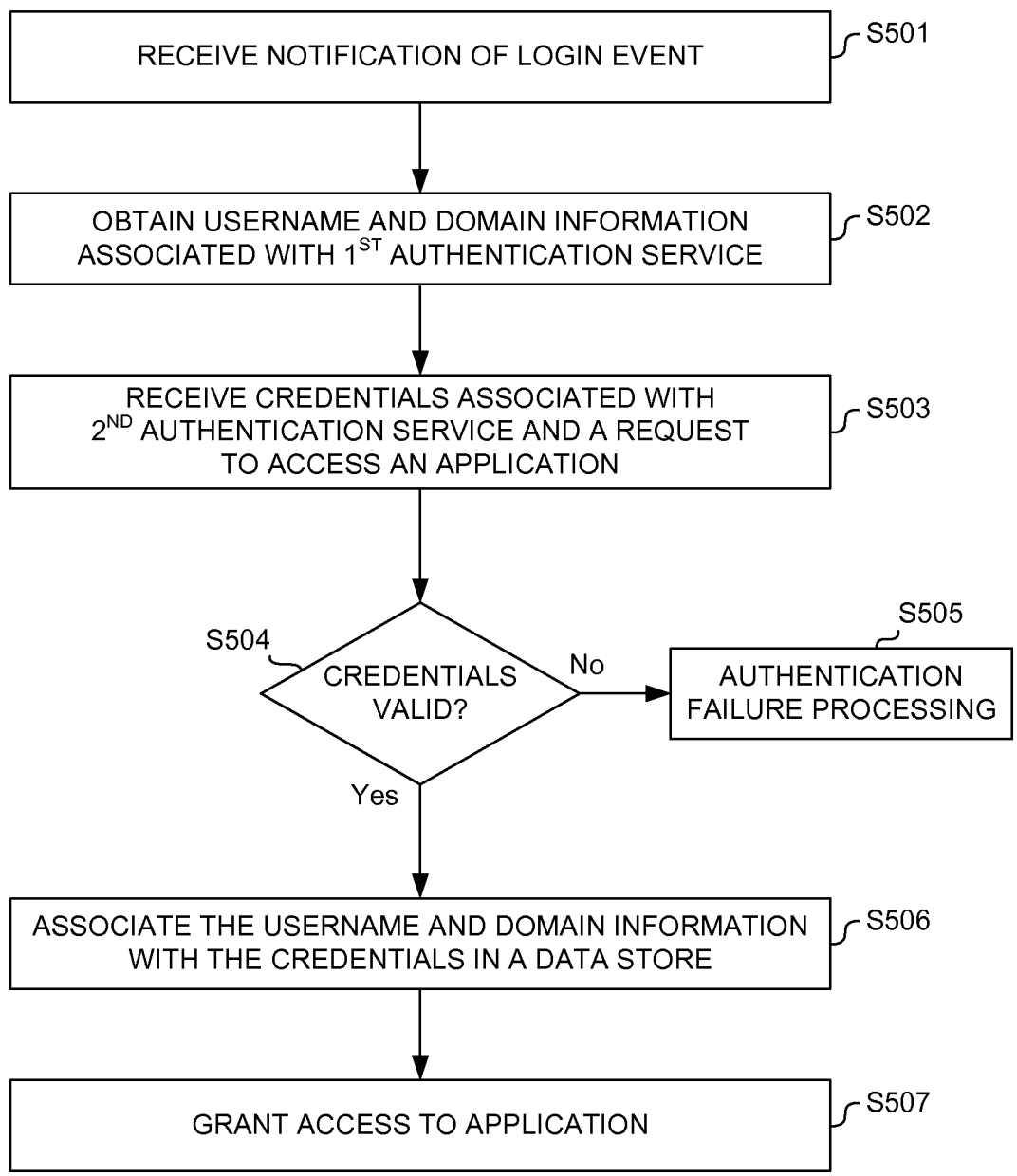
FIG. 5 illustrates an example flow of operations at a server computing system.

FIG. 5 is described with reference to the example network environment 400 of FIG. 4. FIG. 5 illustrates an example flow of operations at the server computing system 401. The operations are performed by the application 406 using the application login service 407. The steps of FIG. 5 may be performed the first time a user logs in to the application 406.

In step S501, the application 406 receives a log-in event notification. The notification is a notification of the log-in event associated with the user's login session on the server computing system 401. The device login application 405 sends the log-in event notification when the user is successfully authenticated by the authentication service 402. Upon successful authentication to the authentication service, the device login application 405 produces a login context.

In step S502, the application 406 obtains a username and domain information passed down from the login event. For example, a user may specify a username, password and domain at the time the user logs in to the server computing system 401. From this information, the application obtains the username and domain information associated with the login event. Because this login event was based on an authentication performed by the authentication service 402, the information pair (i.e., the username and domain) is associated with the authentication service 402.

In step S503, the application 406 receives credentials associated with the authentication service 403 and a request to access the application 406. For example, after the user logs in to the server computing system 401, the user then attempts to access the application 406 on the server computing system 401. The credentials may be any suitable credentials for accessing the application 406. For example, the authentication service 403 may require a username, password, a server name or other identifier for use in locating or identifying a remote server (which may be the same server providing the authentication service 403), and a password for that remote server.

In step S504, the application 406 determines whether the credentials received in step S503 are valid. For example, the application 406 may send the credentials to the authentication service 403 with an authentication request. If the authentication service 403 does not successfully authenticate the user based on the credentials, the authentication service 403 provides an authentication failure response. Based on the authentication failure response, the application 406 determines the credentials are not valid (No in step S504), and the process continues to step S505. In step S505, the application 406 executes operations in response to the authentication failure. For example, the application 406 may prepare and cause to be displayed information indicating to the user that authentication has failed or that the user is denied access to one or more resources of the application 406. The displayed information may include a request that the user provide a credential again, for example.

On the other hand, if the authentication service 403 does successfully authenticate the user based on the credentials, the authentication service 403 provides an authentication success response. Based on the authentication success response, the application 406 determines the credentials are valid (Yes in step S504), and the process continues to step S506.

In step S506, the application 406 associates the username and domain information obtained in step S502 with the credentials received in step S503 in a data store. The data store may, for example, be a data store on the server computing system 401. The data store may be an area of memory or data storage that is managed by and/or accessible to only the application 406. By way of example, the application 406 may store the username and the domain information in random access memory (RAM) of the server computing system 401 such that the two values are associated with each other. In some embodiments, the username and the domain information are stored in a cache memory together. In some embodiments, the username and domain information as a pair are a key. The key, or information pair, may be stored in a database such that the key is associated with the credentials received in step S503. In addition to storing the key and credentials in the database, the application 406 may also encrypt the information in the database, including the key and the credentials. The application 406 may use Advanced Encryption Standard (AES) or Triple DES (Data Encryption Standard) in encryption the database information.

In step S507, the application 406 grants access to the application 406.

Figure 6:
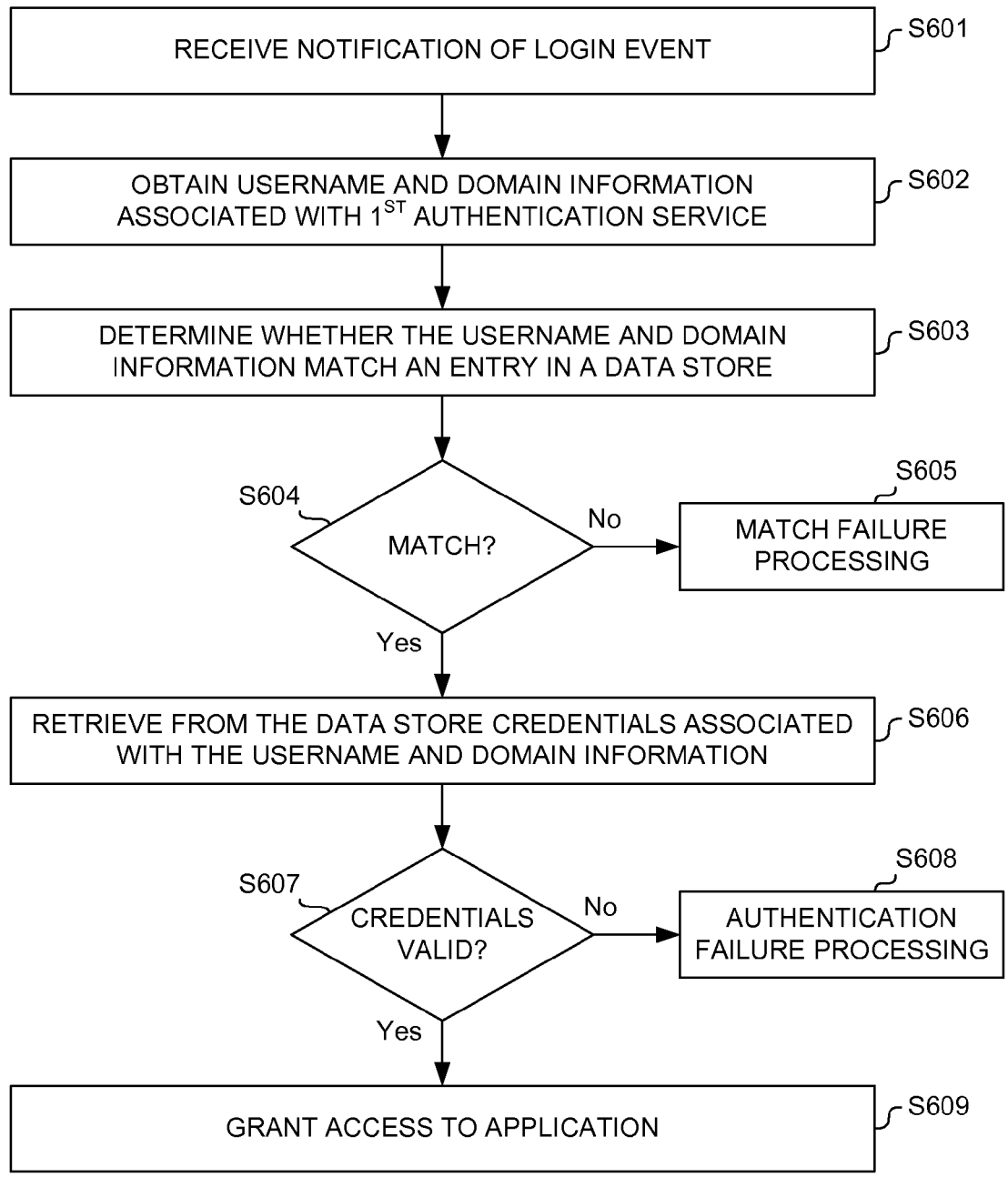
FIG. 6 illustrates an example flow of operations at a server computing system.

FIG. 6 is described with reference to the example network environment 400 of FIG. 4. FIG. 6 illustrates an example flow of operations at the server computing system 401. The operations are performed by the application 406 using the application login service 407. The steps of FIG. 6 may be performed for subsequent login after the first time a user logs in to the application 406 in accordance with the operations performed in FIG. 5.

In step S601, the application 406 receives a log-in event notification. The notification is a notification of the log-in event associated with the user's login session on the server computing system 401. The device login application 405 sends the log-in event notification when the user is successfully authenticated by the authentication service 402. Upon successful authentication to the authentication service, the device login application 405 produces a login context.

In step S602, the application 406 obtains a username and domain information passed down from the login event. For example, a user may specify a username, password and domain at the time the user logs in to the server computing system 401. From this information, the application obtains the username and domain information associated with the login event. Because this login event was based on an authentication performed by the authentication service 402, the information pair (i.e., the username and domain) is associated with the authentication service 402.

In step S603, the application 406 determines whether the username and domain information obtained in step S602 match an entry in a data store. For example, the application 406 may determine whether the username and domain information, as an information pair, match an entry in the data store in which the application stored data in step S506.

In response to determining that the information pair (i.e., the username and domain information obtained in step S503) does not match a key stored in the data store (No in step S604), the process advances to step S605. In step S605 match failure processing is performed. For example, in response to the application 406 not finding a match for the information pair, the application 406 may initiate a login process for the user to manually login to the application 406. The application 406 may prepare and cause to be displayed information indicating to the user that the user should provide one or more credentials to login to the application 406, for example.

On the other hand, in response to determining that the information pair (i.e., the username and domain information obtained in step S503) does match a key stored in the data store (Yes in step S604), the process advances to step S606.

In step S606, the application 406 retrieves from the data store the credentials associated with the username and domain information. For example, in step S506, the application 406 stored credentials in the data store such that the credentials were associated with the key comprised of the username and domain information. Accordingly, in step S606, in a case where that same username and domain information is identified in the data store, the application 406 retrieves the credential information that was stored in step S506.

In step S607, the application 406 determines whether the credentials retrieved in step S606 are valid. For example, the application 406 may send the credentials to the authentication service 403 with an authentication request. If the authentication service 403 does not successfully authenticate the user based on the credentials, the authentication service 403 provides an authentication failure response. Based on the authentication failure response, the application 406 determines the credentials are not valid (No in step S607), and the process continues to step S608. In step S608, the application 406 executes operations in response to the authentication failure. For example, the application 406 may prepare and cause to be displayed information indicating to the user that authentication has failed or that the user is denied access to one or more resources of the application 406. The displayed information may include a request that the user provide one or more credentials, for example.

On the other hand, if the authentication service 403 does successfully authenticate the user based on the credentials, the authentication service 403 provides an authentication success response. Based on the authentication success response, the application 406 determines the credentials are valid (Yes in step S607), and the process continues to step S609. In step S609, the application 406 grants access to the application 406.

Figure 7:
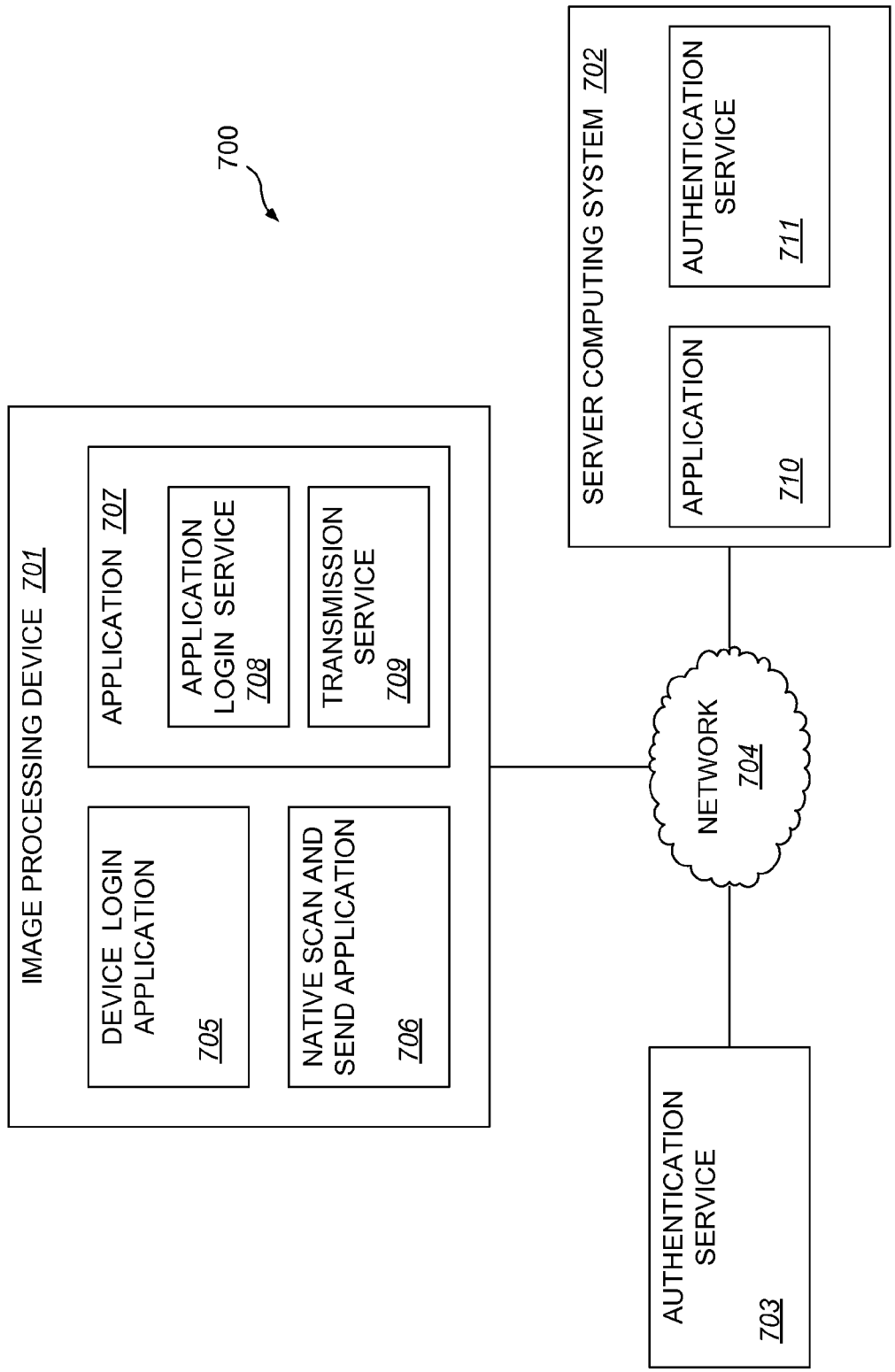
FIG. 7 illustrates an example network environment.

FIG. 7 illustrates an example network environment 700. An image processing device 701, a server computing system 702, and an authentication service 703 are connected to a network 704. The image processing device 701 has a device login application 705, a native scan and send application 706, and an application 707 with an application login service 708 and a transmission service 709. The server computing system 702 has an application 710, and an authentication service 711.

The image processing device 701 includes hardware, software, or both for providing the functionality of the image processing device 701. The image processing device 701 may include one or more servers. For example, the image processing device 701 may include one or more application(s) servers, file servers, database servers, name servers, mail servers, fax servers, or print servers. In some embodiments, the image processing device 701 is unitary. In some embodiments, the image processing device 701 is distributed. The image processing device 701 may span multiple locations. The image processing device 701 may span multiple machines.

In some embodiments, the image processing device 701 performs one or more steps of one or more methods described or illustrated herein. In some embodiments, the image processing device 701 provides functionality described or illustrated herein. In some embodiments, software running on the image processing device 701 performs one or more steps of one or more methods described or illustrated herein or provides functionality described or illustrated herein. Particular embodiments include one or more portions of the image processing device 701.

The image processing device 701 includes the device login application 705. The device login application 705 includes programs and data for controlling access to resources of the image processing device 701. According to various embodiments, the device login application 705 is configured to authenticate users, control access to resources based on authorization, and/or track users' usage of the image processing device 701.

In some embodiments, the device login application 705 uses outside computing systems to perform tasks. For example, the image processing device 701 may be in a network domain that utilizes the authentication service 703 to authenticate users trying to access resources in the network domain. In such a case, the device login application 705 may send an authentication request to the authentication service 703 for authenticating the user. The image processing device 701 may be configured for multiple network domains. Accordingly, the device login application 705 may utilize multiple authentication services to authenticate users in the respective network domains.

When a user logs in to the image processing device 701, upon being authenticated, the device login application 705 sends notification of the log-in event to all applications and/or systems configured to receive the notifications. A listing of applications and/or systems configured to receive the log-in event notifications may be stored at the device login application 705 and/or the authentication service 703. In some embodiments, applications and/or systems who receive the log-in event notifications initiate operations to log in the user to their respective applications and/or systems. Accordingly, single sign-on may be effectuated since the user is logged in both to the image processing device 701 and the respective applications who received the log-in event notifications, even though the user only provided the credential once in order to log in to the image processing device 701.

While the device login application 705 generally protects usage of the entire image processing device 701 by controlling access to its resources, some applications on the image processing device 701 may be independently protected by authentication mechanisms. The application 707 is one such application.

The application 707 includes the application login service 708 to control access to resources of the application 707. The application 707 may also include programs and data configured to execute task-specific functionality. Before granting a user access to resources of the application 707, the application login service 708 authenticates the user regardless of whether other applications also authenticate the user. According to some embodiments, the user is logged in to the application 707 by a single sign-on process such as described herein.

In some embodiments, the application login service 708 uses outside computing systems to perform tasks. For example, the application 707 may be in a network domain that utilizes the authentication service 711 to authenticate users trying to access resources in the network domain. In such a case, the application login service 708 may send an authentication request to the authentication service 711 for authenticating the user. Accordingly, the image processing device 701 may be configured to authenticate to the authentication service 703, while the application 707 on the image processing device 701 is configured to authenticate to a different authentication service, namely the authentication service 711.

Once logged in to the application 707, the user gains access to one or more resources of the application 707, including the task-specific functionality of the application 707. The task-specific functionality of the application 707 enables the user to perform one or more tasks using the application 707. For example, the application 707 may provide various functions, features and user interfaces for processing image data, transmitting data over a network, managing one or more databases, or other tasks. In some embodiments, the application 707 is configured to use one or more resources of the image processing device 701 to perform an operation in response to an instruction from the user. For example, the application 707 may use functionality of and/or information on the image processing device 701 to carry out an operation.

The image processing device 701 includes the native scan and send application 706. The native scan and send application 706 can scan a document and send to a server through one or more protocols such as FTP, WebDAV, and SMB. In some embodiments, the application 707 is configured to use the native scan and send application 706 to carry out a scan and send job. For example, the application 707 may request that the native scan and send application 706 perform scan and send operations for a scan and send job. In some embodiments, the application 707 requests the native scan and send application 706 to perform a portion of a scan and send job, and the application 707 performs a portion of the scan and send job. For example, the application 707 may request that the native scan and send application 706 perform scanning operations and the application 707 may send the resulting scanned document to a destination. The application 707 may include one or more programs for receiving hypertext transfer protocol (HTTP) requests and providing HTTP responses. In some embodiments, the application 707 uses HTTP to send information to the native scan and send application 706.

The application 707 includes the transmission service 709. The transmission service 709 may be an FTP server for the application 707. In some embodiments, the application 707 transmits the scanned document to the destination using the transmission service 709. In some embodiments, the server computing system 702 is the destination to which the application 707 transmits the scanned document using the transmission service 709.

The server computing system 702 includes the application 710 and the authentication service 711. The application 710 may provide functionality of a content management system, a cloud storage service, a document management system, or other service on the server computing system 702. The application 707 on the image processing device 701 may be configured to perform data transmissions, for example, transmission of files, to the server computing system 702. In some embodiments, the native scan and send application 706 is not configured to transmit files to the server computing system 702. In some embodiments, the authentication service 711 provides authentication services for the server computing system 702 and/or the application 710 on the server computing system 702.

The authentication service 703 and the authentication service 711 may each be one or more computing systems configured to authenticate the user of the image processing device 701 and the application 707, respectively. For example, before a user of a computing system or application is granted access to a protected resource of the computing system or application, the user may be required to provide a credential, such as a username and password. The image processing device 701 or application 707 and the authentication service 703 or the authentication service 711, respectively, then communicate and execute various processes according to an authentication protocol such as Kerberos, Windows NT LAN Manager (NTLM), Lightweight Directory Access Protocol (LDAP) or other authentication protocol, in order to determine whether the credential is valid. Once the credential is validated, the user is granted access to the resource. In some embodiments, in addition to verifying the user's identity, the authentication service 703 and the authentication service 711 further determine whether the user has permission or authorization to access one or more of the resources sought.

The authentication service 703 and the authentication service 711 may each provide authentication services for multiple computing systems and/or applications. Also, the authentication service 703 and the authentication service 711 may each be associated with a particular network domain, performing authentication services for computing systems and/or applications within that network domain.

The network 704 couples one or more servers and one or more clients to each other. The network 704 may be any suitable network. For example, one or more portions of the network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 704 may include one or more networks.

Figure 8:
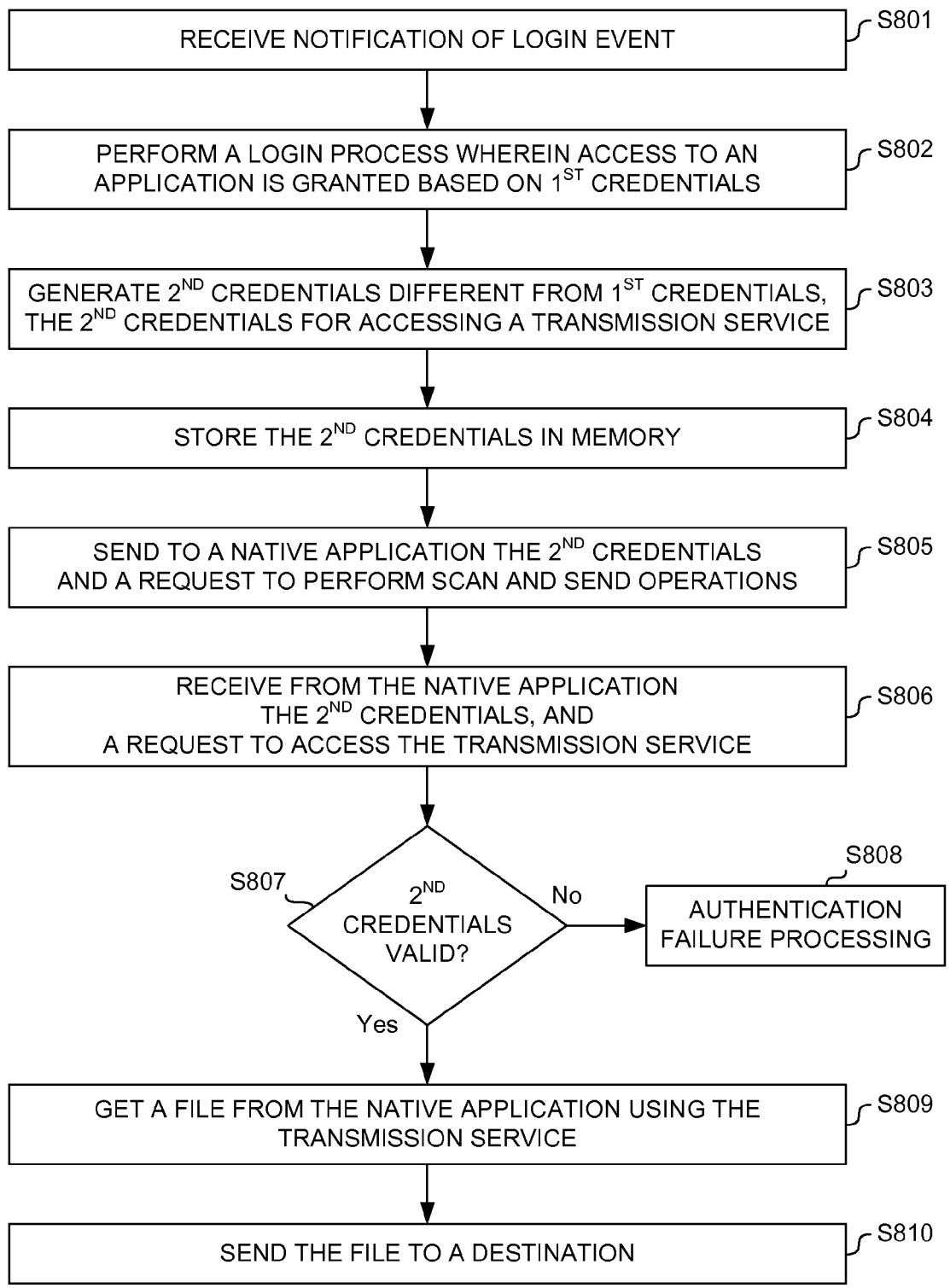
FIG. 8 illustrates an example flow of operations at an image processing device.

FIG. 8 is described with reference to the example network environment 700 of FIG. 7. FIG. 8 illustrates an example flow of operations at the image processing device 701. The operations are performed by the application 707.

In step S801, the application 707 receives a log-in event notification. Step S801 may be performed by the application 707 using the application login service 708. The notification is a notification of the log-in event associated with the user's login session on the image processing device 701. The device login application 705 sends the log-in event notification when the user is successfully authenticated by the authentication service 703. Upon successful authentication to the authentication service, the device login application 705 produces a login context.

In step S802, the application 707 performs a login process. In some embodiments, the application 707 executes the login process in step S802 in response to receiving the log-in event notification in step S801. Step S802 may be performed by the application 707 using the application login service 708. By virtue of the login process, access to the application 707 is granted based on credentials. In some embodiments, the credentials are associated with the authentication service 711. The credentials may be any suitable credentials for accessing the application 707. Examples of the credentials include the following: a username, a password, a server name or other identifier for use in locating or identifying a server, a password for the server, security token information (for example, a token identifier such as the identification number of a smart card), a PIN, biometric information, a certificate, other information associated with the user, or a combination of two or more of these.

According to some embodiments, the login process of step S802 is performed the first time a user logs in to the application 707. By way of example and not by way of limitation, step S802 may include one or more of the following operations the first time a user logs in to the application 707.

In some embodiments, the application 707 obtains a username and domain information passed down from the login event. For example, a user may specify a username, password and domain at the time the user logs in to the image processing device 701. From this information, the application obtains the username and domain information associated with the login event. Because this login event was based on an authentication performed by the authentication service 703, the information pair (i.e., the username and domain) is associated with the authentication service 703.

In some embodiments, the application 707 receives credentials associated with the authentication service 711 and a request to access the application 707. For example, after the user logs in to the image processing device 701, the user then attempts to access the application 707 on the image processing device 701. The credentials may be any suitable credentials for accessing the application 707. For example, the authentication service 711 may require a username, password, a server name or other identifier for use in locating or identifying a remote server (which may be the same server providing the authentication service 711), and a password for that remote server.

In some embodiments, the application 707 determines whether the received credentials are valid. For example, the application 707 may send the credentials to the authentication service 711 with an authentication request. If the authentication service 711 does not successfully authenticate the user based on the credentials, the authentication service 711 provides an authentication failure response. Based on the authentication failure response, the application 707 determines the credentials are not valid, and the application 707 executes operations in response to the authentication failure. For example, the application 707 may prepare and cause to be displayed information indicating to the user that authentication has failed or that the user is denied access to one or more resources of the application 707. The displayed information may include a request that the user provide a credential again, for example.

On the other hand, if the authentication service 711 does successfully authenticate the user based on the credentials, the authentication service 711 provides an authentication success response. Based on the authentication success response, the application 707 determines the credentials are valid, and the process continues.

In some embodiments, the application 707 associates the obtained username and domain information with the received credentials in a data store. The data store may, for example, be a data store on the image processing device 701. The data store may be an area of memory or data storage that is managed by and/or accessible to only the application 707. By way of example, the application 707 may store the username and the domain information in random access memory (RAM) of the image processing device 701 such that the two values are associated with each other. In some embodiments, the username and the domain information are stored in a cache memory together. In some embodiments, the username and domain information as a pair are a key. The key, or information pair, may be stored in a database such that the key is associated with the received credentials. In addition to storing the key and credentials in the database, the application 707 may also encrypt the information in the database, including the key and the credentials. The application 707 may use Advanced Encryption Standard (AES) or Triple DES (Data Encryption Standard) in encryption the database information.

In some embodiments, the application 707 grants access to the application 707.

According to some embodiments, the login process of step S802 is performed for subsequent login after the first time a user logs in to the application 707. By way of example and not by way of limitation, step S802 may include one or more of the following operations for subsequent login after the first time a user logs in to the application 707.

In some embodiments, the application 707 obtains a username and domain information passed down from the login event. For example, a user may specify a username, password and domain at the time the user logs in to the image processing device 701. From this information, the application obtains the username and domain information associated with the login event. Because this login event was based on an authentication performed by the authentication service 703, the information pair (i.e., the username and domain) is associated with the authentication service 703.

In some embodiments, the application 707 determines whether the obtained username and domain information match an entry in a data store. For example, the application 707 may determine whether the username and domain information, as an information pair, match an entry in the data store in which the application 707 stored data during a login process performed the first time a user logged in to the application 707.

In response to determining that the information pair (i.e., the username and domain information obtained during a login process performed the first time a user logged in to the application 707) does not match a key stored in the data store, match failure processing is performed. For example, in response to the application 707 not finding a match for the information pair, the application 707 may initiate a login process for the user to manually login to the application 707. The application 707 may prepare and cause to be displayed information indicating to the user that the user should provide one or more credentials to login to the application 707, for example.

On the other hand, in response to determining that the information pair (i.e., the username and domain information obtained during a login process performed the first time the user logged in to the application 707) does match a key stored in the data store, the process advances.

In some embodiments, the application 707 retrieves from the data store the credentials associated with the username and domain information. For example, during a login process performed the first time the user logged in to the application 707, the application 707 stored credentials in the data store such that the credentials were associated with the key comprised of the username and domain information. Accordingly, in a case where that same username and domain information is identified in the data store, the application 707 retrieves the credential information that was stored during a login process performed the first time the user logged in to the application 707.

In some embodiments, the application 707 determines whether the retrieved credentials are valid. For example, the application 707 may send the credentials to the authentication service 711 with an authentication request. If the authentication service 711 does not successfully authenticate the user based on the credentials, the authentication service 711 provides an authentication failure response. Based on the authentication failure response, the application 707 determines the credentials are not valid, and the application 707 executes operations in response to the authentication failure. For example, the application 707 may prepare and cause to be displayed information indicating to the user that authentication has failed or that the user is denied access to one or more resources of the application 707. The displayed information may include a request that the user provide one or more credentials, for example.

On the other hand, if the authentication service 711 does successfully authenticate the user based on the credentials, the authentication service 711 provides an authentication success response. Based on the authentication success response, the application 707 determines the credentials are valid, and the application 707 grants access to the application 707.

In step S803, the application 707 generates credentials for accessing the transmission service 709. In some embodiments, in step S803, the application 707 generates a random username and password as the credentials for accessing the transmission service 709. The credentials generated in step S803 are different from the credentials used in step S802. Regarding the credentials used in step S802, access to the application 707 is granted based on those credentials, as described with reference to step S802.

In some embodiments, step S803 comprises the application 707 generating the credentials for accessing the transmission service 709 in response to the application 707 being accessed. For example, in some embodiments, access to the application 707 may be granted by virtue of the login process of step S802. In step S803, in response to a user logging in to the application 707 in step S802, the application 107 may automatically generate the credentials for accessing the transmission service 709.

In some embodiments, step S803 comprises the application 707 generating the credentials for accessing the transmission service 709 in response to the application 707 receiving the log-in event notification in step S801. In some embodiments, the application 707 performs step S802 and step S803 in response to receiving the log-in event notification in step S801. For example, the application 707 may initiate execution of both the login process of step S802 and the generation of the credentials of step S803 in response to receiving the log-in event notification. In some embodiments, the application 707 performs operations for step S802 and step S803 simultaneously.

In step S804, the application 707 stores the credentials generated in step S803 in a memory such that the credentials generated in step S803 are associated with the transmission service 709 in order to log in to the transmission service 709. The credentials generated in step S803 may be stored in volatile memory. The credentials generated in step S803 may be stored in a cache.

In step S805, the application 707 sends to the native scan and send application 706 the credentials generated in step S803 and a request to perform scan and send operations for a scan and send job. In some embodiments, the request or information included in the request is based on a scan and send request the application 707 received. For example, the application 707 may receive a scan and send request based on one or more user inputs to the image processing device 701, according to some embodiments. In step S805, in addition to the credentials and the request, the application 707 may also provide scan settings and other information related to the job to the native scan and send application 706. Moreover, in some embodiments, the application 707 also sends its own IP address or other identifier associated with the application 707 to the native scan and send application 706. The native scan and send application 706 may then later use the identifier to send a scanned document to the application 707 by transferring file data. In some embodiments, the application 707 uses HTTP to send information (e.g., the credentials generated in step S803) to the native scan and send application 706 in step S805.

In step S806, the application 707 receives from the native scan and send application 706 the credentials sent in step S805 for accessing the transmission service 709, and a request to access the transmission service 709. For example, the native scan and send application 706 may send a connection request prior to file data being transferred from the native scan and send application 706. In some embodiments, the application 707 also receives the identifier sent in step S805.

In step S807, the application 707 determines whether the credentials received in step S806 are valid. In some embodiments, the application 707 first verifies that the IP address or other identifier that was received in step S806 is an identifier associated with the application 707. Then the application 707 determines whether the credentials received in step S806 are valid by comparing the credentials received in step S806 with the credentials stored in step S804. If the credentials received in step S806 do not match the credentials in the memory, the application 707 determines that the credentials are not valid (No in step S807), and the process advances to step S808. In step S808, authentication failure processing is executed. For example, the application 707 may determine not to execute the requested operations and then clear data associated with the request.

On the other hand, if the credentials received in step S806 do match the credentials in the memory, the application 707 determines that the credentials are valid (Yes in step S807), and the process advances to step S809.

In step S809, the application 707 gets a file from the native scan and send application 706 using the transmission service 709. The file may be an electronic document generated based on the scan and send job sent to the native scan and send application 706. The application 707 uses the transmission service 709 to get the file data transferred from the native scan and send application 706. The transmission service 709 may be a server, implemented by the application 707, that receives file data using a protocol (e.g., FTP, WebDAV, SMB). For example, the transmission service 709 may be an FTP server for the application 707.

In step S810, the application 707 sends the file to a destination. For example, in step 809, the application 707 may use the transmission service 709 to get a scanned document and then, in step S810, the application 707 may send the scanned document to a destination. The destination may be the server computing system 702 of FIG. 7.

Figure 9:
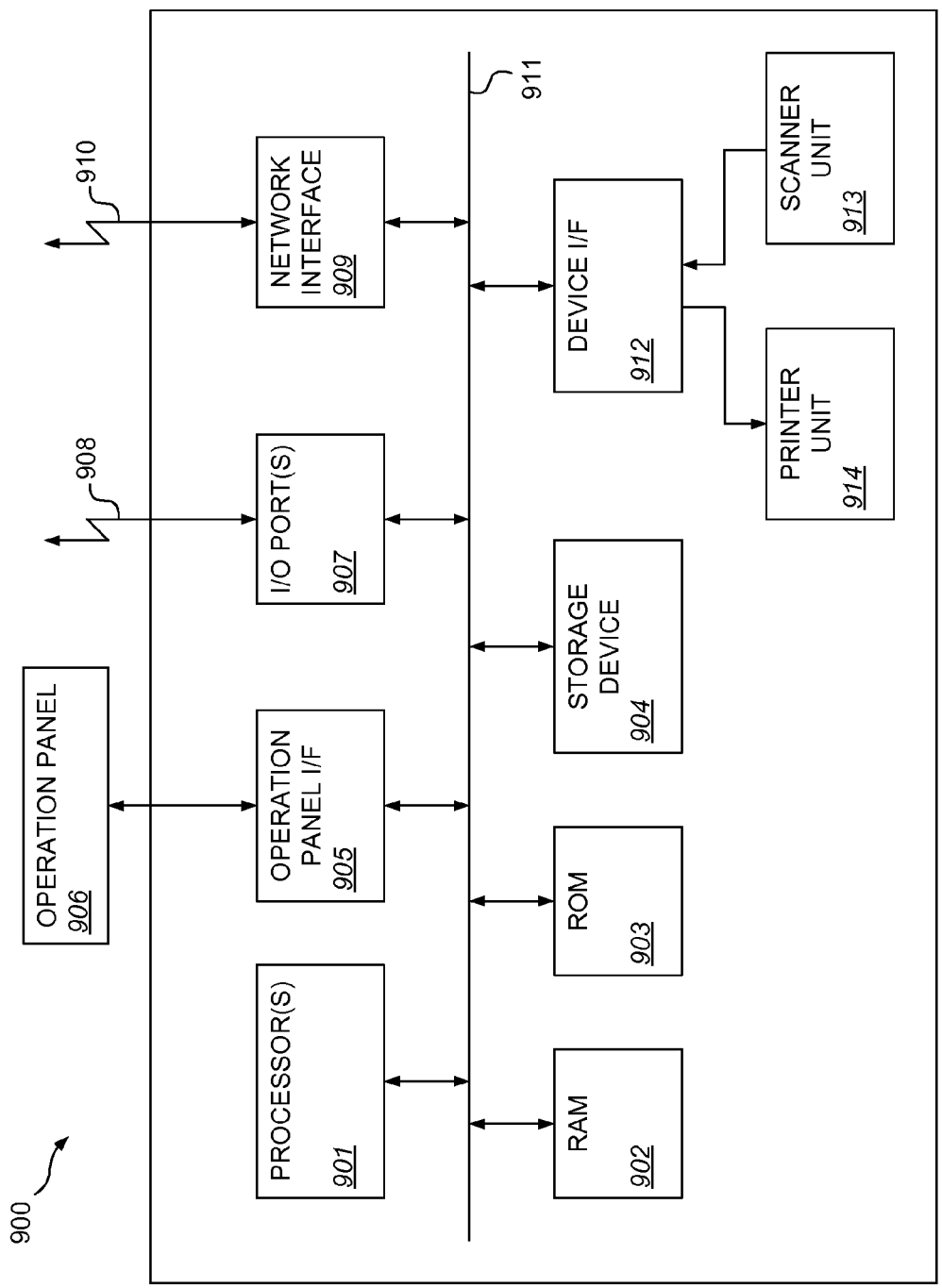
FIG. 9 illustrates an example image processing device.

FIG. 9 illustrates an example image processing device 900. In some embodiments, the image processing device 101 of FIG. 1 comprises the image processing device 900. In some embodiments, the server computing system 401 of FIG. 4 comprises the image processing device 900. In some embodiments, the image processing device 701 of FIG. 7 comprises the image processing device 900. The image processing device 900 of FIG. 9 is a multifunction peripheral having a scanning function in addition to printing, copying and other functions. However, it will be understood that various other implementations of an image processing device are within the scope of the present invention. For example, various components, modules, functions, and/or configurations of the image processing device 900 of FIG. 9 could be combined, deleted, or modified to form further implementations. Further by way of example, in some embodiments, other devices (for example, other devices having scanning capabilities) and/or computing systems (for example, a computer connected to a scanner) may be implemented as the image processing device 900.

In some embodiments, the image processing device 900 performs one or more operations described herein. In some embodiments, the image processing device 900 provides functionality described herein. In some embodiments, software running on the image processing device 900 performs one or more operations described herein.

The image processing device 900 includes one or more processor(s) 901. The processor(s) 901 include a central processing unit (CPU) that performs overall control functions for the image processing device 900. The CPU uses a random access memory (RAM) 902 as a work area while executing instructions. The CPU executes instructions of various programs stored in one or more memory devices. For example, the CPU executes programs stored in a read only memory (ROM) 903 and in a storage device 904.

In some embodiments, the processor(s) 901 include one or more processors in addition to the CPU. By way of example, the processor(s) 901 may include one or more general-purpose microprocessor(s), application-specific microprocessor(s), and/or special purpose microprocessor(s). Additionally, in some embodiments the processor(s) 901 may include one or more internal caches for data or instructions.

The processor(s) 901 provide the processing capability required to execute an operating system, application programs, and various other functions provided on the image processing device 900. The processor(s) 901 perform or cause components of the image processing device 900 to perform various operations and processes described herein, in accordance with instructions stored in one or more memory devices.

The RAM 902 is used as a work area when the processor(s) 901 execute various instructions, such as those making up computer programs stored in the ROM 903 and/or the storage device 904. The RAM 902 may be used as a temporary storage area for various data, including input image data. The RAM 902 may be used as a cache memory. In some embodiments, the RAM may be dynamic RAM (DRAM) or static RAM (SRAM).

The ROM 903 stores data and programs having computer-executable instructions for execution by the processor(s) 901. In some embodiments, the ROM 903 is a boot ROM, storing instructions for the booting process. In some embodiments, the ROM 903 may be flash memory.

The storage device 904 stores application data, program modules and other information. One or more program modules stored in the storage device 904 are configured to cause various operations and processes described herein to be executed. In some embodiments, the application 104 of FIG. 1 resides on the storage device 904 and executes on the image processing device 900. In some embodiments, the application 406 of FIG. 4 resides on the storage device 904 and executes on the image processing device 900. In some embodiments, the application 707 of FIG. 7 resides on the storage device 904 and executes on the image processing device 900.

The storage device 904 also stores other programs and data to be processed. For example, the storage device 904 stores an operating system including programs and data for managing hardware and software components of the image processing device 900. Applications on the image processing device 900 may utilize the operating system to perform various operations. The storage device 904 may further store other programs and/or drivers that enable various functions of the image processing device 900, graphical user interface (GUI) functions, and/or processor functions. The storage device 904 may also store data files including, for example, image data, user data, configuration information, GUI components, such as graphical elements or templates, or other data required by the image processing device 900.

In some embodiments, the image processing device 900 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 900. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 905 provides output signals to and receives input signals from an operation panel 906. Regarding the output signals, the operation panel interface 905 provides GUI data to the operation panel 906 for display on a liquid crystal display (LCD). Regarding the input signals, the operation panel interface 905 receives input signals based on user input operations at the operation panel 906 and relays the input signals to the processor(s) 901. In some embodiments, the operation panel 906 includes a touch sensitive element operable to receive user input operations or commands based on the touching of graphical objects displayed on the LCD. In some embodiments, the operation panel 906 includes a hard key panel.

The image processing device 900 includes one or more input/output (I/O) port(s) 907. The I/O port(s) 907 may include any suitable interface type such as a universal serial bus (USB) port, FireWire port (IEEE-1394), serial port, parallel port, or AC/DC power connection port. The I/O port(s) 907 enable one or more external device(s) 908 to communicate with the image processing device 900 when the external device(s) 908 is/are connected to the I/O port(s) 907. Examples of external devices 908 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 909 includes hardware, software, or both providing one or more interfaces for communication (such as, for example, packet-based communication) between the image processing device 900 and one or more other computing systems or one or more networks 910. As an example and not by way of limitation, the network interface 909 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 910 and any suitable network interface 909 for it. As an example and not by way of limitation, the image processing device 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 910 may be wired or wireless. As an example, the image processing device 900 may communicate with a wireless PAN (WPAN) (such as, for example, a BLUETOOTH WPAN), a WI-FI network, a WI-MAX network, or other suitable wireless network or a combination of two or more of these. The image processing device 900 may include any suitable network interface 909 for any of these networks 910, where appropriate.

A system bus 911 interconnects various components of the image processing device 900 thereby enabling the transmission of data and execution of various processes. The system bus 911 may include one or more types of bus structures including a memory bus or memory controller, a peripheral bus, and a local bus using any of a variety of bus architectures.

The device interface 912 is connected to the scanner unit 913 and to the printer unit 914. The device interface 912 performs synchronous/asynchronous conversion of image data.

The scanner unit 913 includes a light source and an image sensor. The scanner unit 913 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 913 includes an optical system (for example, mirrors, lens) that directs the light to the image sensor. After the image sensor generates the electrical signals, an analog-to-digital converter converts the electrical signals to digital image data representing the scanned physical document. The scanner unit 913 then outputs the digital image data to one or more other components of the image processing device 900 via the device interface 912.

The printer unit 914 is an image output device for printing on a sheet an image corresponding to image data. In response to a print command received at the image processing device 900, the printer unit 914 receives image data via the device interface 912 and outputs to a sheet an image corresponding to the image data.

Figure 10:
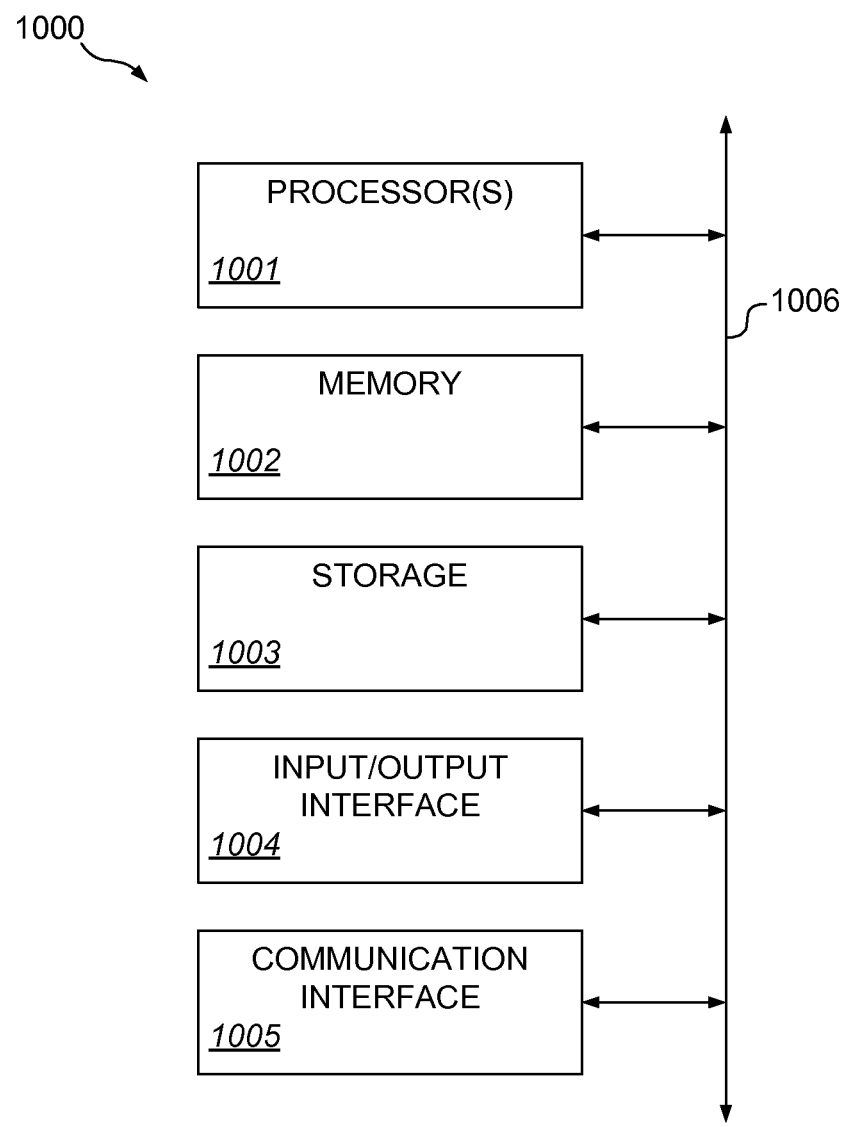
FIG. 10 illustrates an example computing system.

FIG. 10 illustrates an example computing system 1000. According to various embodiments, all or a portion of the description of the computing system 1000 is applicable to all or a portion of one or more of the image processing device 101, and the server computing system 102 of FIG. 1. According to various embodiments, all or a portion of the description of the computing system 1000 is applicable to all or a portion of one or more of the server computing system 401, the authentication service 402, and the authentication service 403 of FIG. 4. According to various embodiments, all or a portion of the description of the computing system 1000 is applicable to all or a portion of one or more of the image processing device 701, the server computing system 702, and the authentication service 703 of FIG. 7.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 1000 performs one or more steps of one or more methods described or illustrated herein. In some embodiments, the computing system 1000 provides functionality described or illustrated herein. In some embodiments, software running on the computing system 1000 performs one or more steps of one or more methods described or illustrated herein or provides functionality described or illustrated herein. Some embodiments include one or more portions of the computing system 1000.

The computing system 1000 includes one or more processor(s) 1001, memory 1002, storage 1003, an input/output (I/O) interface 1004, a communication interface 1005, and a bus 1006. The computing system 1000 may take any suitable physical form. For example, and not by way of limitation, the computing system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 1001 include hardware for executing instructions, such as those making up a computer program. The processor(s) 1001 may retrieve the instructions from the memory 1002, the storage 1003, an internal register, or an internal cache. The processor(s) 1001 then decode and execute the instructions. Then, the processor(s) 1001 write one or more results to the memory 1002, the storage 1003, the internal register, or the internal cache. The processor(s) 1001 may provide the processing capability to execute the operating system, programs, user and application interfaces, and any other functions of the computing system 1000.

The processor(s) 1001 may include a central processing unit (CPU), one or more general-purpose microprocessor(s), application-specific microprocessor(s), and/or special purpose microprocessor(s), or some combination of such processing components. The processor(s) 1001 may include one or more graphics processors, video processors, audio processors and/or related chip sets.

In some embodiments, the memory 1002 includes main memory for storing instructions for the processor(s) 1001 to execute or data for the processor(s) 1001 to operate on. By way of example, the computing system 1000 may load instructions from the storage 1003 or another source to the memory 1002. During or after execution of the instructions, the processor(s) 1001 may write one or more results (which may be intermediate or final results) to the memory 1002. One or more memory buses (which may each include an address bus and a data bus) may couple the processor(s) 1001 to the memory 1002. One or more memory management units (MMUs) may reside between the processor(s) 1001 and the memory 1002 and facilitate accesses to the memory 1002 requested by the processor(s) 1001. The memory 1002 may include one or more memories. The memory 1002 may be random access memory (RAM).

The storage 1003 stores data and/or instructions. As an example and not by way of limitation, the storage 1003 may include a hard disk drive, a floppy disk drive, flash memory, an optical disc, a magneto-optical disc, magnetic tape, or a Universal Serial Bus (USB) drive or a combination of two or more of these. In some embodiments, the storage 1003 is a removable medium. In some embodiments, the storage 1003 is a fixed medium. In some embodiments, the storage 1003 is internal to the computing system 1000. In some embodiments, the storage 1003 is external to the computing system 1000. In some embodiments, the storage 1003 is non-volatile, solid-state memory. In some embodiments, the storage 1003 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 1003 may include one or more memory devices. One or more program modules stored in the storage 1003 may be configured to cause various operations and processes described herein to be executed.

The I/O interface 1004 includes hardware, software, or both providing one or more interfaces for communication between the computing system 1000 and one or more I/O devices. The computing system 1000 may include one or more of these I/O devices, where appropriate. One or more of these I/O devices may enable communication between a person and the computing system 1000. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 1004 includes one or more device or software drivers enabling the processor(s) 1001 to drive one or more of these I/O devices. The I/O interface 1004 may include one or more I/O interfaces.

The communication interface 1005 includes hardware, software, or both providing one or more interfaces for communication (such as, for example, packet-based communication) between the computing system 1000 and one or more other computing systems or one or more networks. As an example and not by way of limitation, the communication interface 1005 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 1005 for it. As an example and not by way of limitation, the computing system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 1000 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 1000 may include any suitable communication interface 1005 for any of these networks, where appropriate. The communication interface 1005 may include one or more communication interfaces 1005.

The bus 1006 interconnects various components of the computing system 1000 thereby enabling the transmission of data and execution of various processes. The bus 1006 may include one or more types of bus structures including a memory bus or memory controller, a peripheral bus, and a local bus using any of a variety of bus architectures.

The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:
1. A method comprising:
   generating credentials for accessing a transmission service;
   sending, from a first application to a second application, the credentials and a request to perform operations related to a scan job;
   receiving, at the first application from the second application, the credentials and a request to access the transmission service;
   determining whether the credentials received from the second application are valid;
   in response to determining that the credentials received from the second application are valid, getting a file from the second application using the transmission service; and
   sending the file to a destination.

2. The method of claim 1, wherein both the transmission service and the second application are on an image processing device.

3. The method of claim 1, wherein generating the credentials for accessing the transmission service comprises generating the credentials at start-up of the first application when the first application is accessed by a user.

4. The method of claim 1, further comprising:
prior to generating the credentials for accessing the transmission service, receiving a request based on a user input to an image processing device,
wherein the request to perform operations related to the scan job is based on the user input to the image processing device.

5. The method of claim 1, wherein generating the credentials for accessing the transmission service comprises generating a random username and password as the credentials for accessing the transmission service.

6. The method of claim 1, further comprising:
storing the credentials in a memory,
wherein determining whether the credentials received from the second application are valid comprises determining whether the credentials received from the second application match the credentials in the memory.

7. The method of claim 6, further comprising:
in response to determining that the credentials received from the second application are valid, deleting the credentials from the memory.

8. The method of claim 1, wherein the file comprises an electronic document the second application generated based on the request to perform operations related to the scan job.

9. The method of claim 1, wherein generating the credentials for accessing the transmission service is performed by the first application, and
wherein the first application includes the transmission service.

10. A non-transitory computer-readable medium storing instructions that, when executed by one or more processors, cause the one or more processors to perform operations comprising:
generating credentials for accessing a transmission service;
sending, from a first application to a second application, the credentials and a request to perform operations related to a scan job;
receiving, at the first application from the second application, the credentials and a request to access the transmission service;
determining whether the credentials received from the second application are valid;
in response to determining that the credentials received from the second application are valid, getting a file from the second application using the transmission service; and
sending the file to a destination.

11. A system comprising:
one or more processors; and
one or more computer-readable media coupled to the one or more processors, the one or more computer-readable media storing instructions that, when executed by the one or more processors, cause the one or more processors to perform operations comprising:
generating credentials for accessing a transmission service;
sending, from a first application to a second application, the credentials and a request to perform operations related to a scan job;
receiving, at the first application from the second application, the credentials and a request to access the transmission service;
determining whether the credentials received from the second application are valid;
in response to determining that the credentials received from the second application are valid, getting a file from the second application using the transmission service; and
sending the file to a destination.

12. The system of claim 11, wherein both the transmission service and the second application are on an image processing device.

13. The system of claim 11, wherein generating the credentials for accessing the transmission service comprises generating the credentials at start-up of the first application when the first application is accessed by a user.

14. The system of claim 11, the operations further comprising:
prior to generating the credentials for accessing the transmission service, receiving a request based on a user input to an image processing device,
wherein the request to perform operations related to the scan job is based on the user input to the image processing device.

15. The system of claim 11, wherein generating the credentials for accessing the transmission service comprises generating a random username and password as the credentials for accessing the transmission service.

16. The system of claim 11, the operations further comprising:
storing the credentials in a memory,
wherein determining whether the credentials received from the second application are valid comprises determining whether the credentials received from the second application match the credentials in the memory.

17. The system of claim 16, the operations further comprising:
in response to determining that the credentials received from the second application are valid, deleting the credentials from the memory.

18. The system of claim 11, wherein the file comprises an electronic document the second application generated based on the request to perform operations related to the scan job.

19. The system of claim 11, wherein generating the credentials for accessing the transmission service is performed by the first application, and
wherein the first application includes the transmission service.

* * * * *